US010223208B2

(12) United States Patent
Wipfel

(10) Patent No.: US 10,223,208 B2
(45) Date of Patent: Mar. 5, 2019

(54) ANNOTATED ATOMIC WRITE

(71) Applicant: Intelligent Intellectual Property Holdings 2, LLC, Wilmington, DE (US)

(72) Inventor: Robert Wipfel, Draper, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 65 days.

(21) Appl. No.: 14/230,844

(22) Filed: Mar. 31, 2014

(65) Prior Publication Data
US 2015/0052395 A1 Feb. 19, 2015

Related U.S. Application Data

(60) Provisional application No. 61/865,565, filed on Aug. 13, 2013.

(51) Int. Cl.
*G06F 11/00* (2006.01)
*G06F 11/14* (2006.01)
*G06F 3/06* (2006.01)

(52) U.S. Cl.
CPC ........ *G06F 11/1451* (2013.01); *G06F 3/0658* (2013.01); *G06F 11/1474* (2013.01)

(58) Field of Classification Search
CPC ............ G06F 11/1451; G06F 11/1474; G06F 3/0658; G06F 11/1471; G06F 9/466; G06F 11/1435

(Continued)

(56) References Cited

U.S. PATENT DOCUMENTS 6,502,174 B1 * 12/2002 Beardsley ........... G06F 12/0866
707/999.202
6,553,511 B1 4/2003 DeKoning et al.
(Continued)

FOREIGN PATENT DOCUMENTS

CN 102239480 A1 11/2011
KR 1020150030786 A 3/2015
(Continued)

OTHER PUBLICATIONS

Application No. PCT/US2014/050882, 3430.2.131PCT, International Search Report and Written Opinion, dated Dec. 18, 2014.
(Continued)

*Primary Examiner* — Yair Leibovich
(74) *Attorney, Agent, or Firm* — Kunzler, PC

(57) ABSTRACT

Techniques are disclosed relating to writing data atomically to one or more recording media. In one embodiment, a request is received to perform an atomic write for a set of data. Responsive to the request, the set of data is written across a plurality of storage units including storing metadata at a dedicated location within at least one of the plurality of storage units. The metadata is usable to determine whether the writing completed successfully. In some embodiments, the request is received from an application that has been assigned an address range of the plurality of storage units. In such an embodiment, the address range is accessible to the application for storing data, and the dedicated location resides outside of the address range. In one embodiment, the metadata specifies an address range where the set of data was written and a sequence number.

18 Claims, 10 Drawing Sheets

(58) Field of Classification Search
USPC .......................................................... 714/19
See application file for complete search history.

(56) References Cited

U.S. PATENT DOCUMENTS

| | | | | |
|---|---|---|---|---|
| 7,636,946 | B2* | 12/2009 | Verma | G06F 21/566 |
| | | | | 707/999.01 |
| 2006/0106971 | A1* | 5/2006 | Mahar | G06F 3/0605 |
| | | | | 711/100 |
| 2009/0292885 | A1* | 11/2009 | Molgaard | G06F 13/1631 |
| | | | | 711/152 |
| 2012/0030408 | A1* | 2/2012 | Flynn | G06F 12/0246 |
| | | | | 711/102 |
| 2012/0066450 | A1 | 3/2012 | Yochai et al. | |
| 2012/0166984 | A1* | 6/2012 | Brunswig | G06F 3/0481 |
| | | | | 715/765 |
| 2013/0166855 | A1 | 6/2013 | Batwara et al. | |
| 2013/0205114 | A1 | 8/2013 | Badam et al. | |
| 2014/0164677 | A1* | 6/2014 | Borchers | G06F 3/0611 |
| | | | | 711/103 |
| 2014/0358868 | A1* | 12/2014 | Costecalde | G06F 17/30303 |
| | | | | 707/692 |
| 2015/0160879 | A1* | 6/2015 | Flynn | G06F 3/061 |
| | | | | 711/103 |
| 2015/0234710 | A1* | 8/2015 | Berrington | G06F 11/1407 |
| | | | | 707/664 |
| 2017/0160980 | A1* | 6/2017 | Golander | G06F 3/0643 |
| 2018/0173625 | A1* | 6/2018 | Moudgill | G06F 9/3004 |

FOREIGN PATENT DOCUMENTS

| | | |
|---|---|---|
| TW | 1630622 A | 7/2018 |
| WO | 2012016089 | 2/2012 |
| WO | 2013105960 | 7/2013 |

OTHER PUBLICATIONS

Mahesh Balakrishnan, Dahlia Malkhi, Vijayan Prabhakaran and Ted Wobber, "Going Beyond Paxos," Microsoft Technical Report, No. MSR-TR-2011-86, Jul. 29, 2011, 16 pages.

PCT/US2014/050882 International Preliminary Report on Patentability, dated Feb. 25, 2016.

Korean Patent Application 10-2016-7005673 (2380.2.200KR), Notice of Allowance, dated May 10, 2017.

Japanese Patent Application 2016-534813 (2380.2.200JP), Reasons for Rejection, dated May 2, 2017.

TW Patent Application No. 103127828 Office Action dated Nov. 7, 2017.

JP Patent Application No. 2016-534813 Decision of Rejection dated Feb. 6, 2018.

TW Patent Application No. 103127828 Notice of Allowance dated Mar. 15, 2018.

CN Patent Application No. 201480045366.9 Office Action dated Feb. 26, 2018.

* cited by examiner

ANNOTATED ATOMIC WRITE

The present application claims the benefit of U.S. Provisional Appl. No. 61/865,565 filed on Aug. 13, 2013, which is incorporated by reference herein in its entirety.

BACKGROUND

Technical Field

This disclosure relates generally to storing data on a physical recording medium, and more specifically to storing data atomically.

Description of the Related Art

In some instances, the writing of data to a storage device can be interrupted such that the data is not completely written to the storage device successfully. This type of failure may occur responsive to, for example, a loss of power to the storage device, a mechanical failure of the storage device, an operating system crash, a severed connection coupling the storage device to a computer system, a loss of network connectivity to a network attached storage (NAS) or storage area network (SAN), etc.

Various attempts have been made to address a storage failure. For example, some storage devices use battery-backed caches to store data while being written to a storage device. In the event of a power failure, the cached data can be used to complete the write once power is restored. As another example, some file systems maintain a journal to track changes made to a storage device. In the event of a failure, the journal can be reviewed to restore the drive to a previously valid state. Examples of such file systems includes the new technology file system (NTFS), the journaled file system (JFS), the third extended file system (ext3), etc. Some applications (such as distributed applications in cloud computing environments) may maintain data until it can be verified that the data has been successfully committed to storage.

SUMMARY

The present disclosure describes embodiments in which data is written atomically across multiple storage devices. In various embodiments, an annotation is stored in conjunction with performance of an atomic write across multiple storage devices. The annotation may be stored in a dedicated location within at least one of the storage devices and includes metadata usable to determine whether the atomic write completed successfully. For example, in one embodiment, the annotation may be used to identify that a portion of the data was not written successfully to one of the storage devices after a hot swap of the storage device. In some embodiments, the annotation is further usable to rollback the atomic write to restore the storage devices to a previous valid state.

In one embodiment, a method is disclosed that includes receiving a request to perform an atomic write operation for a set of data. The method further includes, responsive to the request, writing the set of data across a plurality of storage units including storing metadata at a dedicated location within at least one of the plurality of storage units. The metadata is usable to determine whether the writing completed successfully.

In another embodiment, an apparatus is disclosed that includes a vector storage module and a rollback module. The vector storage module is configured to perform a group of storage operations for a set of data on a plurality of storage devices, including storing metadata independent of the set of data. In such an embodiment, the metadata is indicative of the group of storage operations. The rollback module is configured to rollback the group of storage operations based on the stored metadata.

In still another embodiment, an apparatus is disclosed that includes a storage module and an error detection module. The storage module is configured to attempt an atomic write for a set of data to an address range associated with a group of storage devices. The storage module is also configured to store metadata in a storage block having an address external to the address range such that the metadata is indicative of writing the set of data. The error detection module is configured to determine, based on the metadata, whether the atomic write completed successfully In yet another embodiment, an apparatus is disclosed that includes a first means and a second means. The first means is for storing data using a log-structure, where the first means includes a plurality of storage blocks. The second means is for writing data atomically to a subset of the plurality of storage blocks and writing metadata to a storage block that is not within the subset, wherein the metadata is usable to rollback the writing of the data.

In another embodiment, a method is disclosed. The method includes an application issuing a request for an atomic write operation. In such an embodiment, the atomic write operation includes writing a set of data across a plurality of storage units and writing metadata at a dedicated location within at least one of the plurality of storage units. The method further includes the application determining, based on an attempt to read the metadata, whether the atomic write operation completed.

Figure 1:
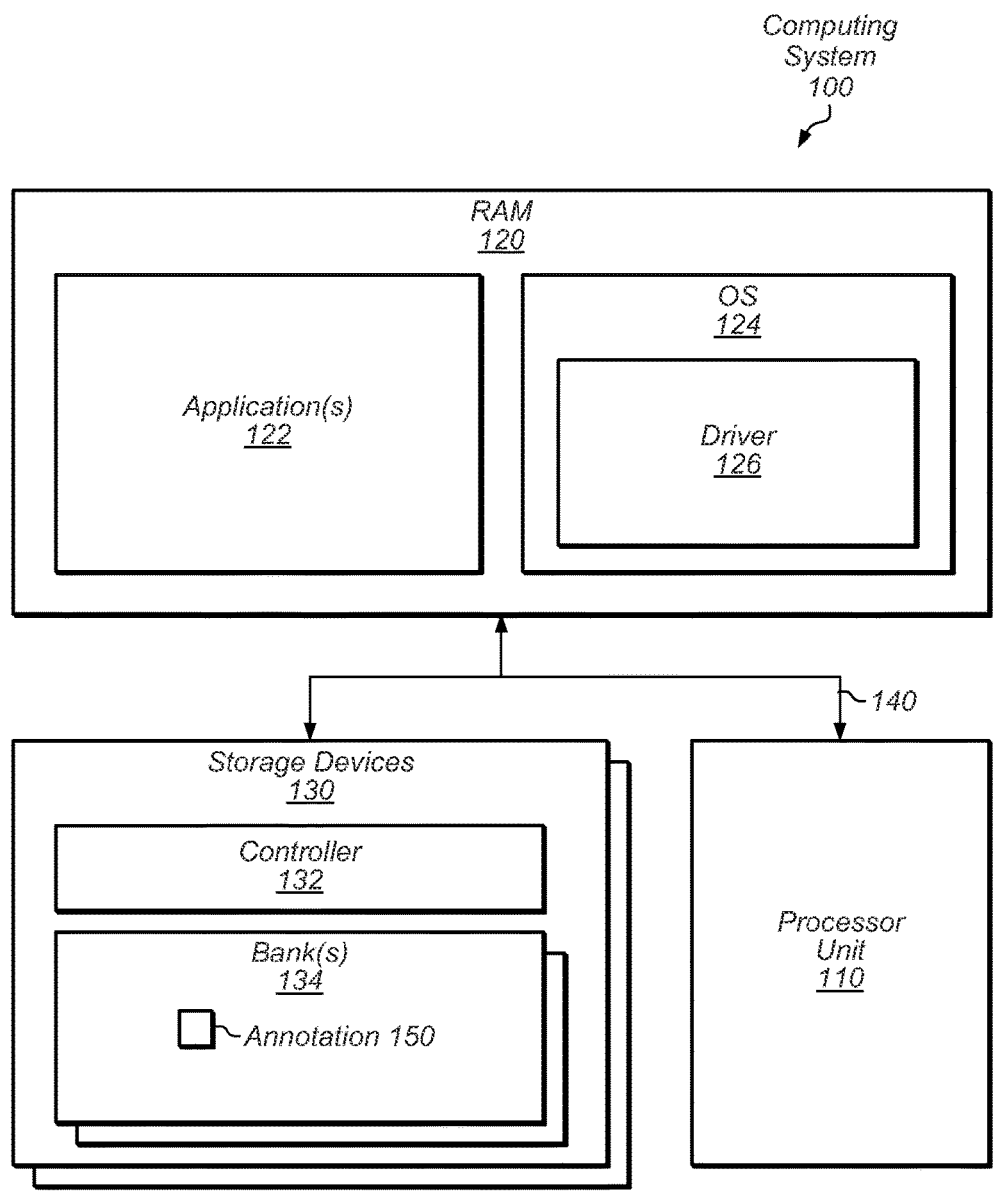
FIG. 1 is a block diagram illustrating one embodiment of a computing system that is configured to atomically write data to multiple storage devices.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. § 112, sixth paragraph, for that unit/circuit/component.

Various units, circuits, or other components may be described using the terms "first," "second," etc. These terms are used as labels for nouns that they precede, and do not imply any type of ordering (e.g., spatial, temporal, logical, etc.). For example, in a storage device having multiple storage blocks, the terms "first" and "second" storage blocks can be used to refer to any two storage blocks (e.g., including storage blocks that are included within other storage blocks). In other words, the "first" and "second" storage blocks are not limited to the initial two storage blocks of the storage device.

DETAILED DESCRIPTION

Various embodiments are described herein with respect to the atomic writing of data. The term "atomic" has its ordinary and accepted meaning in the art, and refers to the performance of an operation such that, if the operation fails prior to completion, the operation has no effect. Accordingly, an atomic write is one in which a write operation is performed such that, if it fails prior to completion (e.g., a power failure occurs prior to all data being written), it does not change the state of the storage device (i.e., does not affect already stored data on the storage device). The term "atomic" may also refer to a group of operations such that failure of one of the operations causes the group to have no effect. As will be discussed below, a set of data may be written across multiple storage devices (referred to as a "vector write") by performing a group of write operations (e.g., a respective write operation of a portion of the set of data to each storage device). Accordingly, when such a write is performed atomically, if one of the write operations fails (e.g., a power loss occurs at one of the storage devices), none of the group of write operations has an effect. In some instance, one or more actions may be performed to remove any effect of a failed atomic write. These recovery actions may be referred to generally as a "rollback." For example, when data is being written atomically across multiple devices, write operations to specific ones of the devices may have completed successfully while others may have failed. In such a case, the data of the successful write operations may be marked as invalid. (Alternatively, in some embodiments described below, the option may be given to allow partially written data to remain on the storage device even though the atomic write failed.)

The disclosure initially describes, with reference to FIG. 1, a computing system configured to atomically write data across multiple storage devices. A driver usable to facilitate atomic write operations is described with reference to FIG. 2. To facilitate this description, logical and physical address spaces associated with the storage devices are described with reference to FIGS. 3A-3C. Embodiments of a packet usable in atomic write operations is described with reference to FIGS. 4A and 4B. Embodiments in which atomic write operations are performed are described in further detail with reference to FIGS. 5-7B. An exemplary storage system that includes such a computing system is finally described with reference to FIG. 8.

Turning now to FIG. 1, a block diagram of computing system 100 is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 8. In the illustrated embodiment, computing system 100 includes a processor unit 110, random access memory (RAM) 120, one or more storage devices 130 coupled together via an interconnect 140. As shown, RAM 120 may include program instructions for one or more applications 122 and an operating system (OS) 124 executable by processor unit 110. OS 124 may include a driver 126 for storage devices 130, which, in turn, may include a controller 132 and one or more storage banks 134.

In various embodiments, driver 126 is described as having various functionality. This functionality may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within OS 124 should not be seen as limiting, but rather as a depiction of an exemplary embodiment.

Storage devices 130 are representative of any physical medium upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to a storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc. The term "solid-state storage array," as used herein, refers to a storage array that includes non-volatile solid-state media such as the various forms of media described below.

References in this disclosure to "accessing" data in a storage device 130 refers to any type of transaction, including writing data to a storage device 130 and/or reading data from a storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage devices 130 may be implemented such that they include non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage devices 130 may be implemented such that they include non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage devices 130 may be implemented such that they include volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage devices 130. Such functionality may be applicable to any suitable form of memory including both non-volatile and volatile forms. Thus, while particular embodiments of driver 126 are described herein within the context of non-volatile solid-state memory arrays, driver 126 may also be applicable to other recording media such as volatile memories and other types of non-volatile memories, particularly those that include a reclamation process.

Controller 132, in one embodiment, is configured to manage operation of a storage device 130. Accordingly, controller 132 may facilitate performance of read operations at specified addresses (e.g., "physical addresses" as discussed below) including selecting the appropriate banks 134 and accessing the data within the appropriate cells within those banks Controller 132 may facilitate performance of write operations including programming of particular cells. Controller 132 may also perform preparation operations to permit subsequent writes to a storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCIe), serial advanced technology attachment (serial ATA or SATA), parallel ATA (PATA), small computer system interface (SCSI), IEEE 1394 (FireWire), Fiber Channel, universal serial bus (USB), etc. In some embodiments, controller 132 may also perform other operations such as error checking, data compression, encryption and decryption, packet assembly and disassembly, etc.

In various embodiments, a storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to an address range (i.e., a collection of one or more addresses) that can be used to specify data within a storage device. As will be described below, a log-structured storage may have both logical and physical address spaces. The term "logical address space" refers to an address space as perceived by higher-level processes (e.g., applications 122 and OS 124) even though this address space may not be representative of how data is actually organized on the physical media of a storage device 130 or the actual number of physical address locations actually in use, reserved, or allocated to a higher-level process. In contrast, the term "physical address space" refers to the address space used by lower-level processes and may be indicative of how data is organized on the physical media of a storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in a storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists). Similarly, the term "invalidating" refers to the marking of data as invalid (e.g., storing a record in a data structure). Invalidating may also refer to the writing an instance of data to a storage device 130 when a previous instance of the data exists on the storage device 130 (the latter instance being made obsolete by the writing of the new instance).

OS 124, in one embodiment, implements a file system to facilitate the retrieval of data by applications 122. As used herein, the term "application" (or "process") refers generally to a collection of program instructions executable by one or more processors. Examples of applications may include, for example, OS 124, a file system manager, a database management system (DBMS), a user space library, a driver (e.g., driver 126, filter drivers, a redundant array of independent disks (RAID) driver, etc.), etc. In the illustrated embodiment, applications 122 are user-level applications. The term "user-level" is used to describe applications that are not responsible for management of a computer system. Examples of user-level applications may include, for example, word processing applications, web browsers, etc. User-level applications stand in contrast to kernel-level (or system-level) applications that manage operation of a computer system. Examples of kernel-level applications may include, for example, an operating system, drivers, a hypervisor, etc. In one embodiment, OS 124 may restrict access to certain functionality (e.g., files, addresses, hardware, etc.) of computer system 100 by user-level applications; however, OS 124 may not restrict such functionality for kernel-level applications.

In some embodiments, application data of applications 122 may be organized into one or more partitions called "virtual storage units." As used herein, the term "virtual storage unit" or "VSU" refers to an allocated set of storage blocks (e.g., logical blocks) usable by one or more applications to store application data. In some embodiments, VSUs may be implemented such that they present a larger logical address space to applications 122 than the actual physical address space. As such, the total number of logical blocks allocated to VSUs may exceed the number of available storage blocks on the physical media. In order to make this allocation scheme work, VSUs may be managed such that a VSU using less of its allocation shares physical media space with a VSU using more of its allocation. In some embodiments, VSUs may also be used to facilitate caching of data from secondary drives. As used herein, the term "storage unit" refers generally to either a storage device or a virtual storage unit within a storage device.

In some instances, an application 122 may access data within storage devices 130 by specifying a corresponding file name to OS 124 via an application programming interface (API) request (in other instances, an application 122 may access data directly by specifying an address to be read from or written to). In response to receiving the request, OS 124 may access various file system information corresponding to directories and files (e.g., within a set of inodes, file allocation tables, etc.) to determine one or more addresses where data for the file is stored.

Driver 126, in one embodiment, is executable to permit applications 122 and OS 124 to interact with storage devices 130. Accordingly, driver 126 may receive requests to perform read and write operations at specified logical block addresses and may issue corresponding commands to controller 132 to implement those operations. In some embodiments, driver 126 manages garbage collection for storage devices 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage one or more translation maps (such as maps 222 discussed below in conjunction with FIG. 2) including adding and removing translations from the maps as data is manipulated on storage devices 130.

In various embodiments, driver 126 may support performance of atomic write operations. As discussed above, an atomic write may be advantageous to conventional write operations because of its ability to have no effect in the event of a failure. Accordingly, in one embodiment, driver 126 supports an atomic write to one of the storage devices 130. As will be described below, in some embodiments, to facilitate such a write operation, data may be encapsulated within one or more packets that include a header with various forms of metadata. In one embodiment, this metadata may include one or bits that identify that the data is being stored as part of the atomic write. Driver 126 may further access this metadata to determine whether the write completed successfully and to rollback the atomic write if warranted. In various embodiments, driver 126 also supports an atomic write across multiple storage devices 130, virtual storage units, or a combination thereof (Accordingly, while particular embodiments may be described herein with respect to an atomic write across multiple storage devices, such a description may also be applicable to virtual storage units—including multiple virtual storage units located within a single storage device.) In such an embodiment, a set of data may be divided into portions which are distributed among the storage units. For example, a set of data spanning a range of addresses may be divided based on addresses. A group of write operations may then be performed such that each one stores a portion to a respective storage device 130. In the illustrated embodiment, to facilitate the atomic write, driver 126 further stores an annotation 150 as part of the atomic write to determine whether each of the write operations performed to the storage devices 130 were committed successfully. Accordingly, if one of the write operations fails (e.g., a power failure to one of the storage devices 130 occurs midway through), driver 126 (or an application 122) may use the annotation 150 to identify that the vector write did not complete successfully and rollback the write.

Annotation 150, in one embodiment, is metadata that is stored at a dedicated location within at least one of the storage devices 130. That is, the location does not include any of the application data for which the atomic write is being performed. (In other embodiments, annotation 150 may be stored in a non-dedicated location, however.) As will be described below in conjunction with FIG. 3A, in some embodiments, this location may be inaccessible to applications other than driver 126 such as applications 122. For example, in one embodiment, driver 126 (or OS 124) may deny an application 122's request for data if it species the address of this location. In another embodiment, an application 122 may have a limited view of the total address space such that the application is unaware of any addresses outside of this limited view; the location may then reside at one of these outside addresses. In some embodiments, this location may be static—e.g., driver 126 may always write annotation 150 to the same logical block address (LBA) or LBAs. In other embodiments, however, the location of annotation 150 may be dynamic. In one embodiment, the location of annotation 150 may be independent of the data that is being stored—e.g., annotation 150 may reside at a logical block address that is disjointed from the addresses where the data is stored. In one embodiment, annotation 150 is stored at the beginning of the atomic write so that, if a failure occurs at some point, there is a higher likelihood that at least the annotation 150 was successfully stored. Thus, annotation 150 may be available to facilitate identifying the failure and any rollback. In another embodiment, annotation 150 may be stored at the end of the atomic write. Thus, the mere presence of the annotation 150 may signify that the atomic write completed successfully.

In some embodiments, driver 126 supports multiple forms of rollback for an atomic write. Accordingly, in one embodiment, driver 126 supports a full rollback in which all data for an atomic write (e.g., the requested data to be written as well as any recorded metadata about the write) is invalidated if the write fails. In some embodiments, driver 126 alternatively supports a partial rollback in which a portion of the written data may be allowed to remain on storage devices 130, while other portions may be invalidated. As will be described below in conjunction with FIG. 2, in such an embodiment, driver 126 may interface with an application 122 in order to provide the application 122 with information about a write failure as well as provide the application 122 with different options for rolling back the atomic write. In some embodiments, the application 122 may select whether a full rollback, partial rollback, or no rollback is performed depending upon the information provided by driver 126.

In various embodiments, implementing an atomic write through recording metadata such as an annotation 150 may be advantageous as it may reduce the overhead for performing an atomic write across multiple storage units. For example, an atomic write across multiple storage devices 130 may include driver 126 performing a handshake with each storage device 130 such that driver 126 sends a request and waits for a corresponding acknowledgement from each storage device 130. Driver 126 may further maintain a log of sent requests and received acknowledges in order to determine that an atomic write has failed when no acknowledgement is received from a storage device 130. Maintaining a log and communicating handshakes in this manner, however, can result in maintaining a significant amount of additional metadata and significantly increase the amount of bus traffic between driver 126 and storage devices 130. Accordingly, in various embodiments in which recording metadata is used, driver 126 may implement an atomic write through recording metadata such as an annotation 150 without performing handshake operations, communicating acknowledgments, and maintaining a log.

Figure 2:
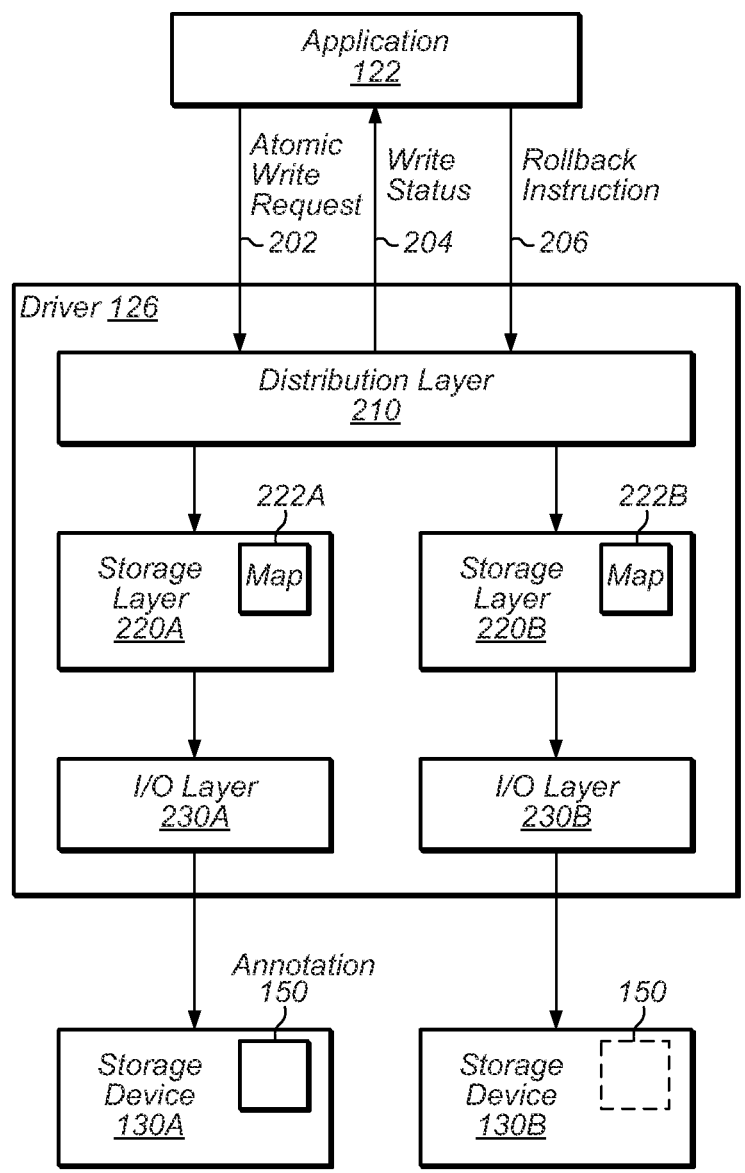
FIG. 2 is a block diagram illustrating one embodiment of a driver for the storage device that is executable to perform atomic write operations.

Turning now to FIG. 2, a block diagram of driver 126 is depicted. In the illustrated embodiment, driver 126 includes a distribution layer 210, storage layers 220A and 220B, and input/output (I/O) layers 230A and 230B. In other embodiments, driver 126 may be arranged differently than shown.

Distribution layer 210, in one embodiment, manages data storage across multiple storage units (e.g., storage devices 130 in the illustrated embodiment) including performance of atomic writes. Accordingly, distribution layer 210 may receive read and write requests from applications 122 and/or OS 124, determine the appropriate one or more storage devices 130, and issue corresponding instructions to storage layers 220 discussed below. For example, in one embodiment, a given request may specify a range of addresses; distribution layer 210 may then use a map (similar to maps 222 described below) to identify the storage devices 130 associated with addresses in that range. In some embodiments, distribution layer 210 also interfaces with applications 122 to perform atomic writes (e.g., via an API). Accordingly, in the illustrated embodiment, distribution layer 210 may receive atomic write requests 202, providing indications of write statuses 204, and receive rollback instructions 206.

Atomic write requests 202, in one embodiment, are requests from an application 122 to perform atomic writes. In some embodiments, atomic write requests 202 may include an instance (i.e., a copy) of the data to be written, one or more addresses (e.g., LBAs), and/or an indication that the request is for an atomic write (as opposed to a non-atomic write). In response to an atomic write request 202, distribution layer 210 may issue one or more corresponding instructions to lower layers 220 and 230. In the case of a distributed write (i.e., a write across multiple storage devices 130), distribution layer 210 may instructions to storage layers 220 for writing the data as well as one or more instructions to store an annotation 150 on a storage device 130 such as storage device 130A. In some embodiments, distribution layer 210 may also store multiple redundant instances of an annotation 150 for a given write on multiple storage devices 130 (as indicated by the dot block in FIG. 2)—e.g., annotation 150 may be stored on each of storage devices 130, a subset of storage devices 130, etc. As will be described in conjunction with FIG. 4B, in one embodiment, annotation 150 includes a sequence number and an address range associated with the atomic write (e.g., the LBA range specified in the atomic write request 202). In such an embodiment, the sequence number is indicative of an ordering in which write operations occurred. For example, in one embodiment, distribution layer 210 may maintain a counter that is adjusted every time it receives a write request (atomic or non-atomic). In some embodiments, distribution layer 210 may append the sequence number to each portion of data stored in storage devices 130. That is, in such an embodiment, if first and second portions are written to storage devices 130A and 130B respectively, each portion may include a respective instance of the sequence number (in addition to the instance of sequence number included in the annotation 150).

In some embodiments, atomic write requests 202 may also include data provided by an application 122 for storage in an annotation 150. For example, in one embodiment, an application 122 may maintain various forms of metadata, which may be maintained specifically for performance of atomic writes or for some other purpose. In such an embodiment, an application 122 may provide this metadata to driver 126 so that it can be stored in an annotation 150. Thus, an application 122 may be able to define and manage what metadata is stored within an annotation 150, in some embodiments. Still further, in some embodiments, an application 122 (as opposed to driver 126) may use this information to determine whether an atomic write failed.

In various embodiments, distribution layer 210 may determine whether an atomic write completed successfully based on metadata in annotation 150 as noted above. (In another embodiment, however, this determination may be performed by application 122 based on information provided by driver 126—e.g., via write status 204 discussed below.) In one embodiment, distribution layer 210 performs this determination for each atomic write request 202 that it receives. Alternatively, in another embodiment, distribution layer 210 performs this determination after receiving an indication that a system failure has occurred, which may have caused a write failure. For example, distribution layer 210 may receive an indication from OS 124 that computing system 100 is rebooting, or has rebooted without undergoing proper shutdown procedures, that connectivity between computing system 100 and a storage device 130 was interrupted, etc. In one embodiment, to determine whether an atomic write has completed successfully, distribution layer 210 may initially attempt to read the annotation 150 (or annotations 150) associated with that write. If the annotation 150 is not present or corrupted, distribution layer 210 may determine that the write did not complete successfully. If, however, the annotation 150 is read successfully, in one embodiment, distribution layer 210 may read the address range specified in the annotation to identify where the written data was stored. In one embodiment, distribution layer 210 may further attempt to read the sequence numbers stored with the data and compare them with the sequence number stored in the annotation 150. If these numbers do not match, distribution layer 210 may conclude that the atomic write did not complete successfully. Other the hand, if the sequence numbers do match, distribution layer 210 may conclude that the write completed successfully. (Other techniques for determining whether a write failed are discussed below in conjunction with FIG. 4B). In either event, distribution layer 210 may provide an indication of its conclusion to the application 122 that issued the request 202 via a write status 204.

Write statuses 204, in one embodiment, indicate whether write operations associated with atomic write requests 202 have completed successfully. In some embodiments, a status 204 may merely include a boolean value indicating a failure or a success. In various embodiments, however, write statuses 204 may include additional information usable by applications 122. For example, in one embodiment, a write status 204 may indicate that a write failed and also identify the addresses (e.g., LBAs) where data was not written to successfully (or conversely, where data was successfully written). In one embodiment, a write status 204 may further identify the storage device or devices 130 associated with the failure as well as identifying a potential cause of failure (e.g., an inability to communicate with one or more storage devices 130). Based on this information, in some embodiments, an application 122 may make an educated determination on how it wants driver 126 to address the failure and provide a corresponding indication such as a rollback instruction 206.

In some embodiments, rather than including an explicit indication of whether an atomic write completed, write statuses 204 may include information that is usable by application 122 to deduce whether an atomic write failed. For example, in one embodiment, driver 126 may perform an atomic write by initially writing the data and then subsequently writing an annotation 150. Still further, driver 126 may support an API call from an application 122 that allows the application 122 to query whether particular addresses (e.g., LBAs) have been written to (i.e., whether valid data exist at those locations). In such an embodiment, an application 122 may issue an atomic write request 202 and then query, via the API call, whether the address of the annotation 150 has been written to. In this example, a write status 204 may correspond to a response issued by distribution layer 210 for the query. If the write status 204 indicates that the address has not been written to, the application 122 may conclude that the annotation 150 was not stored, and thus, that the atomic write failed. In another embodiment, an application 122 may merely attempt to read the annotation 150 and receive a write status 204 indicating a failure with the read. As a result, the application 122 may conclude that the atomic write was unsuccessful based on the attempted read. In other embodiments, write statuses 204 may include other information usable by an application 122 such as content from an annotation 150, checksum values, timestamps, etc.

Rollback instructions 206, in one embodiment, specify whether driver 126 is to perform a rollback of an atomic write, which may include failed atomic writes as well as successful (i.e., completed) atomic writes. (In another embodiment, distribution layer 210 may perform a rollback automatically upon detection of a failure—i.e., without receiving an explicit instruction to do so.) As discussed above, in some embodiments, driver 126 may support multiple forms of rollback such as a full rollback, a partial rollback, etc. Accordingly, in such an embodiment, a rollback instruction 206 may specify the form of rollback to be performed. In some embodiments, a rollback instruction 206 may also include an instance of the data that was written incorrectly so that driver 126 can successfully complete the write operation. More specifically, in such an embodiment, data that is being written atomically may be cached elsewhere in computing system 100 (e.g., RAM 120 or processor unit 110) until it can be verified that the data was successfully written to a storage device 130. (In one embodiment, this caching ability may be a function of the application 122; in other embodiments, this may be performed by the OS 124, driver 126, etc.). If a write failure occurs, the missing data (e.g., as identified by the addresses specified in a write status 204) may be included a rollback instruction 206 to complete the write operation by attempting to write the missing data to the storage devices 130. In one embodiment, when driver 126 is performing a full rollback or a partial rollback to remove written data during a failed atomic write, driver 126 may issue one or more TRIM commands to invalidate the data, which, as discussed above, may include the requested data being stored as well as any metadata recorded during the write. In other embodiments, driver 126 may use other techniques for removing the data written during a failed atomic write such as erasing the data, overwriting the data, etc.

Storage layers 220, in one embodiment, manage operations with respect to a given storage device 130. In one embodiment, storage layers 220 translate logical addresses to corresponding physical addresses as discussed in further detail in conjunction with FIGS. 3A-3C. In the illustrated embodiment, each storage layer 220 maintains a respective map 222 for its device 130. (In other embodiments, storage layers 220 may share a map, a map may be maintained by some other block, etc.) In various embodiments, maps 222 maintain translations for logical addresses to physical addresses within a storage device 130. Accordingly, as data becomes moved and invalidated, it may reside in different physical addresses on a storage device 130 over time. Through the use of a map 222, however, an application may be able access a most recent set of data by specifying the same logical address (e.g., the same logical block address (LBA)) even though two or more versions of the data may reside in different physical addresses. Maps 222 may be implemented using any suitable data structure. According, in one embodiment, maps 222 are binary-tree data structures. In others embodiments, a map 222 may be an array, a linked list, a hash table, etc. In some embodiments, a map 222 may be implemented using multiple data structures. In various embodiments, storage layers 220 may manage grooming (i.e., the identifying and reclaiming of storage blocks so that they can be subsequently programmed to store data—also referred to as garbage collection) for their respective storage devices 130. Storage layers 220 may use any of various criteria for selecting storage blocks for reclamation such as amount of invalid data, temperature of data (i.e., how frequently the data is accessed), the amount of erroneous data detected when data is read from those blocks, etc.

I/O layers 230 interface driver 126 with storage controllers 132 on storage devices 130. Accordingly, I/O layers 230 may handles lower-level interfacing operations such as issuing program, erase, and read commands to controllers 132. I/O layers 230 may also track various forms of drive state for storage devices 130. In some embodiments, I/O layers 230 may communicate with a DMA controller to configure one or channels for DMA transactions across interconnect 140. Although shown as independent blocks, I/O layers 230 may be one block in one embodiment.

Figure 3A:
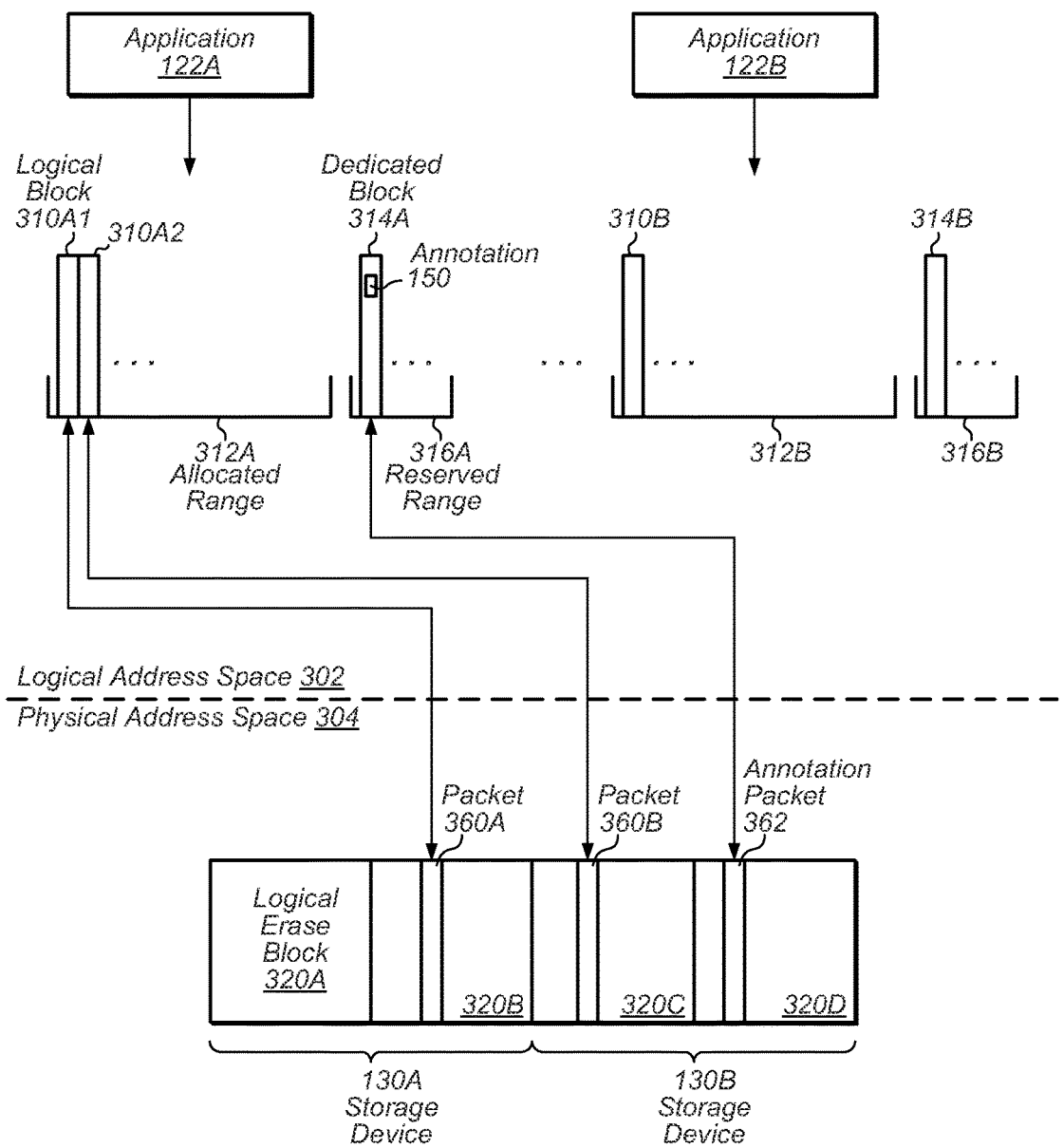
FIGS. 3A-3C are block diagrams illustrating embodiments of logical and physical address spaces.

Turning now to FIG. 3A, a block diagram of atomic storage with respect to a logical address space 302 and a physical address space 304 is depicted. In one embodiment, logical address space 302 represents the organization of data as perceived by higher-level processes such as applications 122 and OS 124. In one embodiment, physical address space 304 represents the organization of data on the physical media.

Logical address space 302, in one embodiment, is divided into logical addresses corresponding to respective logical blocks 310A-310D (also referred to as sectors). In some embodiments, the logical addresses are logical block addresses (LBAs) (in other embodiments, the logical addresses may correspond to some other form of logical identifiers). In one embodiment, logical sectors/blocks 310 represent the smallest block of data associated with a given logical address. As but one example, a logical block 310 may be approximately 512 bytes in size (while logical erase blocks and logical pages discussed below may be approximately 40 MB and 8 kB, respectively). As yet another example, a logical block 310 may be approximately 4 kB.

Physical address space 304, in one embodiment, is divided into physical addresses corresponding to the arrangement of data on the physical recoding media. As will be discussed in further detail with respect to FIG. 3B, in one embodiment, the content of logical blocks 310 may be stored as packets 360 within logical erase blocks 320. As discussed with respect to FIG. 3C, in various embodiments, physical address space 304 may be organized as a log structure, in which write operations may be performed at only one or more append points.

In some embodiments, driver 126 may present a logical address space 302 that is significantly larger than the physical address space 304 of storage device 130 such that the logical address space 302 is a "sparse address space." (For the purposes of this disclosure, a sparse address space is any logical address space that is at least 10% larger than the physical address space of the underlying storage devices.) For example, in one embodiment, driver 126 may present a 48-bit sparse address space relative to a 32-bit physical address space. In such an embodiment, applications 122 may consume considerably less than the total address range of logical address space 302 such that considerable unused portions of logical address space 302 may exist between blocks of stored data.

In some embodiments, driver 126 may allocate portions of logical address space 302 to applications 122 for data storage. For example, in the illustrated embodiment, applications 122A and 122B have been allocated logical address ranges 312A and 312B, respectively. (In other embodiments, however, applications 122 may share an allocated range 312.) Accordingly, application 122A may read and write data by addressing logical blocks 310 within range 312A. For example, in one embodiment, application 122A may request an atomic write for an address range that includes logical blocks 310A1 and 310A2. These logical blocks 310 may then be stored across storage devices 130A and 130B as packets 360A and 360B. Similarly, application 122B may access data (such as data in logical block 310B) by addressing logical blocks 310 within range 312B. In some embodiments, ranges 312 may correspond to separate partitions (also referred to as virtual storage units (VSUs) as discussed above) on storage devices 130.

In various embodiments, location of packets 360 written during an atomic write may be dependent on the mapping of logical addresses to corresponding physical addresses (which, in turn, may be dependent on the particular arrangement of partitions as well as the particular arrangement of storage devices 130 in computing system 100). Accordingly, in the illustrated embodiment, an atomic write of logical blocks 310A1 and 310A2 is performed to packet 360A and 360B located in storage devices 130A and 130B, respectively, because the logical addresses of logical blocks 310A1 and 310A2 mapped to the physical addresses in both storage device 130A and 130B. In other instances, the logical addresses of logical blocks 310A1 and 310A2 may have mapped differently such that the data is written to merely one of storage devices 130 (or merely, some subset of storage devices 130). Thus, in one embodiment, an application 122A may issue a first request for an atomic write that results in data being stored in both storage devices 130A and 130B and may issue a second subsequent request that results in data being stored merely on storage device 130A.

As discussed above, in various embodiments, driver 126 may store one or more annotations 150 that are usable to detect failure of an atomic write and rollback the atomic write. In the illustrated embodiment, an annotation 150 is stored within a logical block 310—shown for illustration purposes as a dedicated block 314. In such an embodiment, dedicated blocks 314 may be located within a reserved logical address range 316. In one embodiment, dedicated range 316 is a range of one or more logical block addresses that is reserved for storing dedicated blocks 314 (i.e., a range 316 does not include logical blocks 310 with application data from user-level applications such as applications 122 discussed above). In some embodiments, a range 316 may reside external to ranges 312 and may be inaccessible to applications 122 (as discussed above, this may be due to driver 126 denying any data request that specifies an address in a reserved range 316, an application 122 may not be aware of the existence of any addresses in a reserved range 316, etc.). In one such embodiment, an application 122 may still be able to read content of annotation 150 via an API call to driver 126; however, application 122 may not be able to directly access the content via a read request specifying the address (or addresses) of annotation 150. Although depicted as a reserved logical address range, in other embodiments, address range 316 may be a physical address range including one or more physical addresses of storage devices 130. In such an embodiment, address range 316 may span multiple storage devices 130 or reside on merely a single one of storage devices 130. In still other embodiments, address range 316 may not be reserved—i.e., annotation 150 may be stored in a storage block that is interspersed with storage blocks that include user data (i.e., data of a user-level application). Range 316 may also include addresses that are continuous or non-continuous. In the illustrated embodiment, applications 122A and 122B are each associated with a respective one of ranges 316A and 316B. In such an embodiment, each range 316 may store annotations 150 for writes associated with its respective application 122. For example, dedicated block 314A may store an annotation 150 for the most recent atomic write requested by application 122A; dedicated block 314B may store an annotation 150 for the most recent atomic write requested by application 122B—thus, driver 126 may be able to perform a rollback for either atomic write. In some embodiments, a range 316 may be capable of storing multiple dedicated blocks 314 for a set of most recent atomic writes. For example, range 316A may store the annotations 150 for the last four requested atomic writes. In other embodiments, applications 122 may share a reserved range 316. In some embodiments, a range 312 may be located together with its corresponding range 316—e.g., range 316A may abut range 312A. In other embodiments, ranges 316 may be disjointed from their respective ranges 312. In some embodiments, ranges 316 may be located together—e.g., ranges 316 may form one contiguous range of logical addresses. In some embodiments, ranges 316 may be static; in other embodiments, ranges 316 may be dynamic.

In the illustrated embodiment, dedicated blocks 314 are stored as annotation packets 362. In some embodiments, annotation packets 362 may be protected so that they are not inadvertently modified or deleted by applications 122, a garbage collection process of driver 126, etc. To accomplish this, in one embodiment, annotation packets 362 may be stored in a particular reserved area on storage devices 130—e.g., a particular logical erase block 320 that is reserved for storing metadata maintained by driver 126. Access to the particular reserved area on storage devices 130 may be controlled such that an application 122 can access only the metadata for its atomic storage operation. One embodiment of an annotation packet 362 is discussed below in conjunction with FIG. 4B.

Figure 3B:
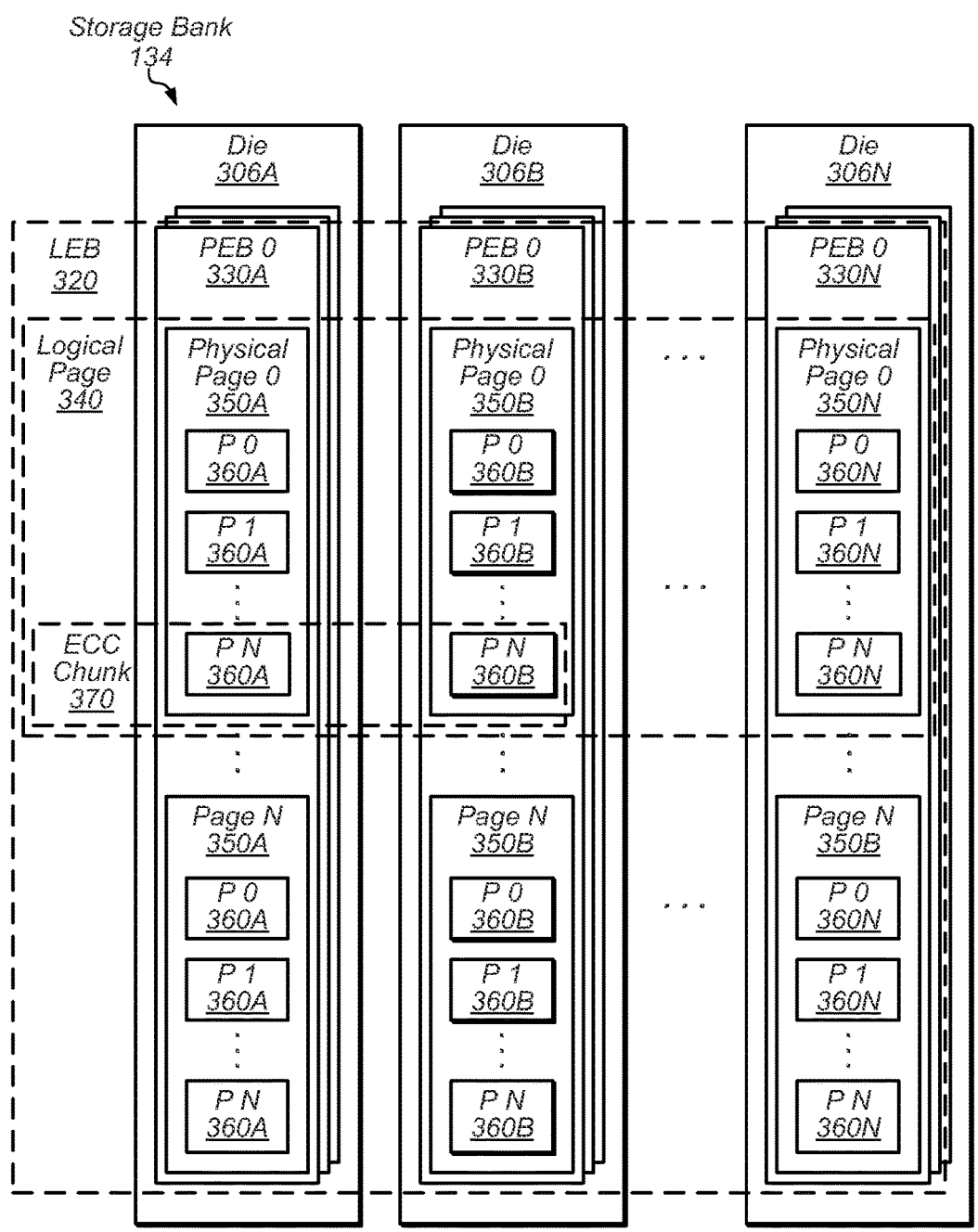

Turning now to FIG. 3B, a block diagram of storage blocks within storage device 130 is depicted. In the illustrated embodiment, a storage bank 134 is organized into logical erase blocks (LEBs) 320 that include multiple physical erase blocks (PEBs) 330, which are located in separate dies 306. A logical erase block 320 is further divided into multiple logical pages 340 that, in turn, include multiple physical pages 350. Physical pages 350 include multiple packets 360, which may be grouped into error correction code (ECC) chunks 370.

As used herein, the term "erase block" refers broadly to a logical erase block or a physical erase block. In one embodiment, a physical erase block 330 represent the smallest storage block with a given storage bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the logical erase block 320 simultaneously. It is noted that physical erase blocks 330 within a given logical erase block 320 (e.g., blocks 330A and 330B) may be considered as contiguous in physical address space 304 even though they reside in separate die 306. Thus, the term "contiguous" may be applicable not only to data stored within the same physical medium, but also to data stored within separate media.

In one embodiment, a physical page 350 represents the smallest storage block within a given storage bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple dies 306 may result in faster access times for a set of data when multiple dies 306 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 310 as they may include the contents of a logical block 310 (or multiple blocks 310 in some instances) as well as a packet header.

In some embodiments, driver 126 may associate metadata with one or more of storage blocks 320-370. As used herein, the term "metadata" refers to system data usable to facilitate operation of solid-state storage device 130; metadata stands in contrast to, for example, data produced by an applications (i.e., "application data") or forms of data that would be considered by an operating system as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. As will be described in conjunction with FIG. 4A, a packet 360 may also include various forms of metadata. In various embodiments, driver 126 may use this information, along with other forms of metadata, to manage operation of storage device 130. For example, driver 126 might use this information to facilitate performance of read and write operations, recover storage device 130 to a previous state (including, for example, reconstruction of various data structures used by driver and/or replaying a sequence of storage operations performed on storage device 130), etc.

Figure 3C:
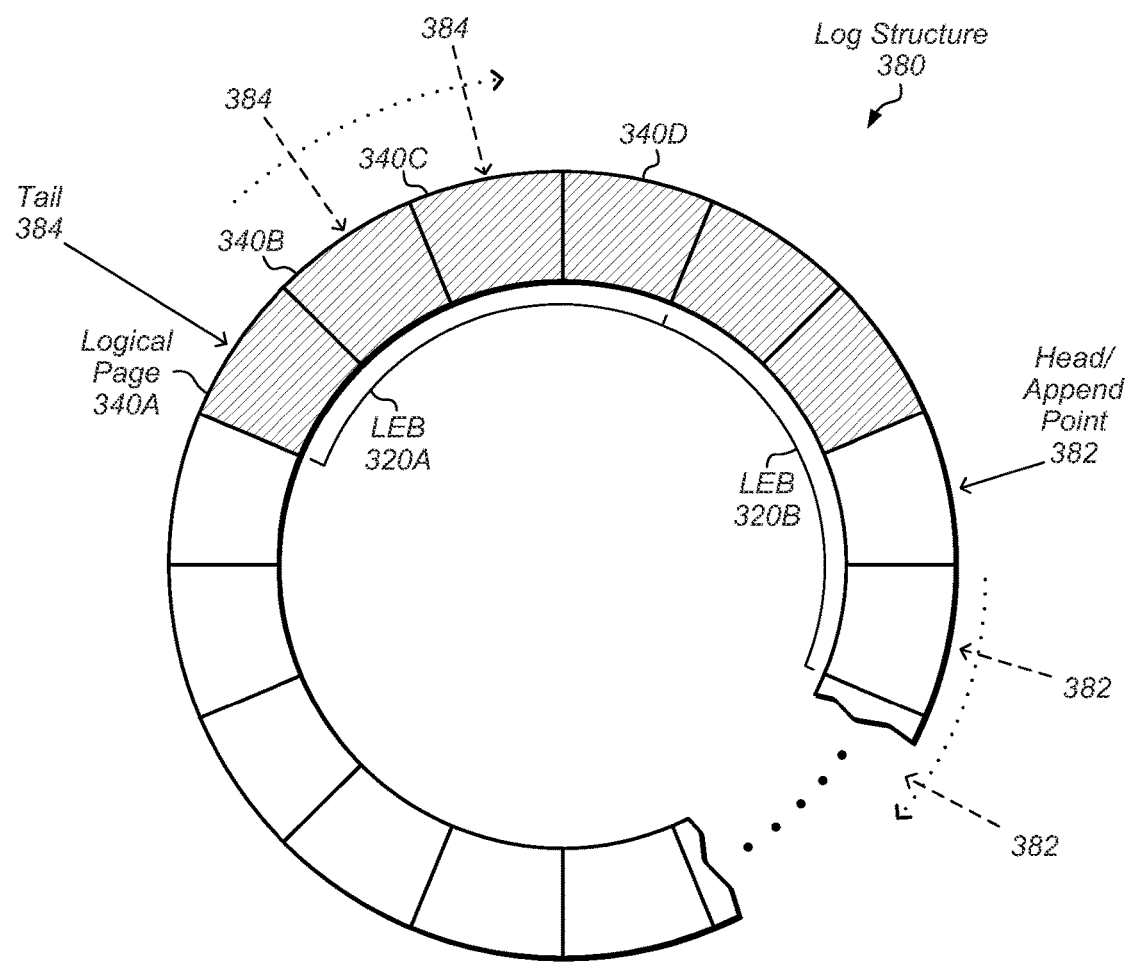

Turning now to FIG. 3C, a block diagram of log structure 380 within physical address space 304 is depicted. As shown, in various embodiments, data is stored sequentially at an append point 382 (also referred to as the "head") that starts at an initial logical page 340—e.g., page 340A. As additional data is stored, append point 382 advances to subsequent logical pages 340 in log structure 380—e.g., page 340B, 340C, and so on. (As used herein, the term "adjacent" may be used to describe storage blocks that are written one after the other in sequential order. For example, as shown, logical page 340A is adjacent to logical page 340B; LEB 320A is adjacent to LEB 320B.) Eventually, after storing enough data, the append point 382 reaches the "last" page 340 in storage device 130, at which point the append point 382 wraps back to the initial logical page 340. Thus, log structure 380 is depicted as a loop/cycle. As more data is stored, the number of available logical pages 340 (shown as unshaded pages 340) decreases and the number of used logical pages 340 (shown as shaded pages 340) increases. As discussed above, in order to reuse these logical pages 340 (i.e., make them available to receive further writes), in one embodiment, driver 126 performs erase operations on logical erase blocks 320. In one embodiment, a tail 384 is maintained to identify the oldest logical page 340 still in use within structure 380 (pages other than the one located at the tail are considered to be younger than the tail). When the logical erase block 320 with the oldest logical page 340 is eventually erased, tail 384 is advanced forward to the next oldest logical page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

In embodiments in which multiple storage devices 130 are used, each storage device 130 may be implemented as a separate respective log structure. Accordingly, in one embodiment, each storage layer 220 may track an append point for its respective storage device 130. Thus, when a write is performed access multiple storage devices 130, each portion of data may written to a respective one of the append points of the storage devices 130. Said differently, a portion of data may be written to append point 382 for storage device 130A, a portion of data may be written to an append point 382 for storage device 130B, and so on. In other embodiments, however, storage devices 130 may be organized in a non-log-structured format.

Figure 4A:
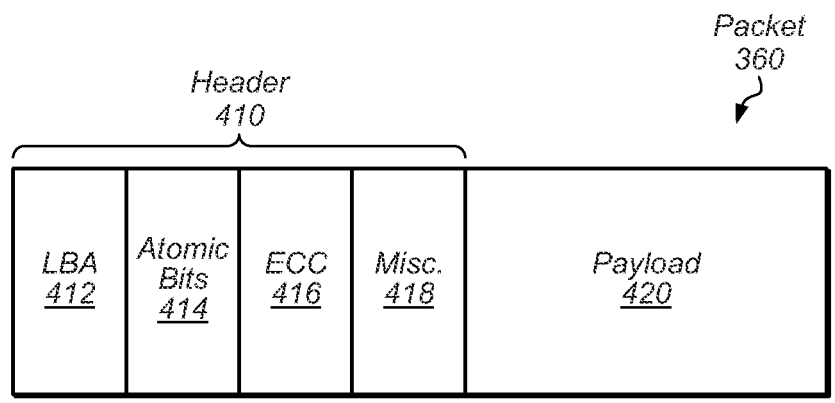
FIGS. 4A and 4B are block diagrams illustrating embodiments of packets usable to facilitate atomic storage.

Turning now to FIG. 4A, a block diagram of a packet 360 is depicted. In the illustrated embodiment, packet 360 includes a header 410 and a payload 420. As discussed above, in various embodiments, a packet 360 may include various forms of metadata usable by driver 126. In the illustrated embodiment, this metadata includes a logical block address (LBA) 412 for the data in payload 420, a set of atomic bits 414, and an error correction code (ECC) 416. Packet header 410 may also include additional forms of metadata (as indicated by miscellaneous block 418) such as a packet size, linkages to other packets, etc. In other embodiments, blocks 412-420 may also be arranged differently than shown.

Atomic bits 414, in one embodiment, are usable to determine whether an atomic write to a single storage device 130 has failed. In one embodiment, atomic bits 414 may indicate the beginning and ending packets 360 in a set of packets 360 stored during an atomic write. Accordingly, if a starting or ending packet 360 is missing or corrupt, driver 126 may conclude that the write did not complete successfully. In various embodiments, atomic bits 414 are distinct from annotation 150, which is usable to determine whether an atomic write across multiple storage devices 130 has failed as discussed above and described next.

Figure 4B:
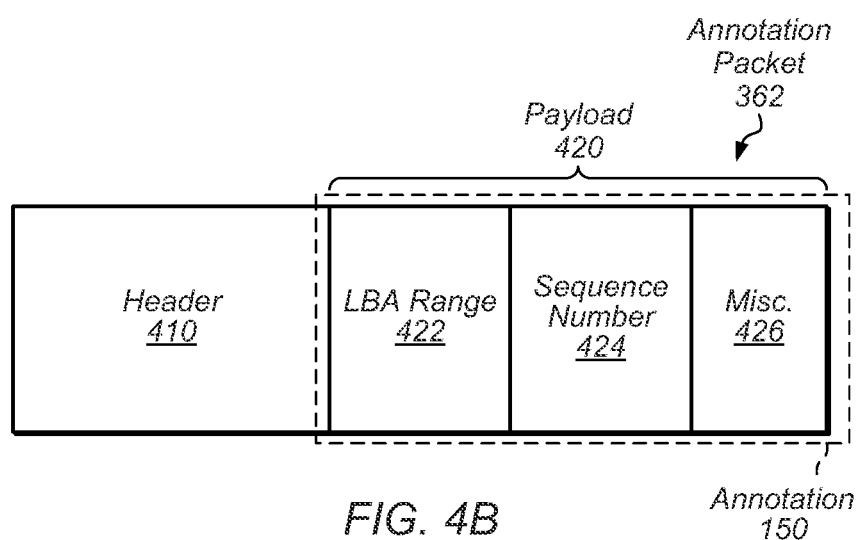

Turning now to FIG. 4B, a block diagram of an annotation packet 362 is depicted. In the illustrated embodiment, annotation packet 362 includes a header 410 and a payload 420, which includes an annotation 150. As discussed above, in some embodiments, an annotation 150 includes an LBA range 422 to which an atomic write was performed and a sequence number 424 corresponding to when the atomic write occurred. That is, a sequence number 424 may include a time stamp (e.g., indicative of the time of data, an amount of time that computing system 100 has been operating, etc.), a value indicative of the number of write operations having been performed, etc. In some embodiments, each atomic write across multiple storage units is assigned a respective sequence number 424. In other embodiments, each individual write to a storage unit that makes up an atomic write is assigned a respective sequence number 424—thus, for example, an atomic write across four storage devices would be assigned four respective sequence numbers for the four individual writes making up the atomic write. In some embodiments, a sequence number 424 may be assigned to each message issued to facilitate an atomic write. For example, an atomic write may include performing multiple individual write operations to each storage device 130 that further include issuing multiple messages per individual write operation; accordingly, in such an implementation, each message may be assigned a sequence number 424. Annotation 150 may also include additional information (as indicated by miscellaneous block 426) such as an indication of the storage devices 130 used during the atomic write, metadata other than that used to facilitate an atomic write (i.e., metadata that is used for some other purpose), etc. This information may also include metadata provided by an application 122 as discussed above. Annotation 150 in annotation packet 362 may also be implemented differently than shown. Accordingly, in other embodiments, blocks 422-426 may be arranged differently; more or less blocks may be present.

Driver 126 may use various techniques for determining whether an atomic write failed based on metadata in an annotation 150. In one embodiment, an instance of the sequence number is stored with each set of packets 360 that is written to a storage device 130. For example, the sequence number may be written in a payload 420 for the last packet 360 in each set. In such an embodiment, driver 126 may use LBA range 422 to identify where these sequences numbers are stored. Driver 126 may then compare these numbers with sequence number 424. If they do not match, driver 126 may conclude that the write failed. If, however, they match, driver 126 may conclude that the write completed successfully. In another embodiment, driver 126 may compare the LBAs in range 422 with LBAs 412 in packets 360. If they do not match, driver 126 may conclude that the write did not complete successfully. In still another embodiment, driver 126 may use LBA range 422 to identify the relevant packets 360 on various storage devices 130. Driver 126 may then use atomic bits 414 to determine whether any of the individual write operations performed to storage devices 130 failed. Accordingly, if atomic bits 414 indicate a failure for one of the write operations, driver 126 may conclude that the atomic write across the multiple storage devices 130 failed. In various embodiments, if a rollback is being performed, driver 126 may issue TRIM commands for each of the addresses specified in address range 422 (or a subset of the addresses in the case of a partial rollback) to invalidate the data at those locations.

Figure 5:
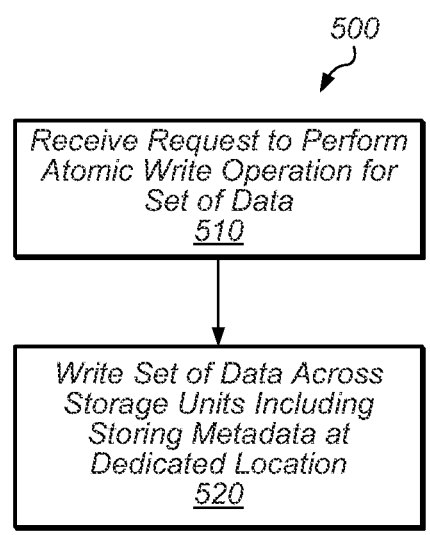
FIG. 5 is a flow diagram illustrating one embodiment of a method.

Turning now to FIG. 5, a flow diagram of a method 500 is depicted. Method 500 is one embodiment of a method that may be performed by an apparatus such as computing system 100 or storage device 130. Accordingly, in one embodiment, the apparatus may execute program instructions of a driver such as driver 126 to perform method 500. In some embodiments, performance of method 500 may improve a systems ability to recover from a crash such as a power loss, operation system failure, storage device failure, etc.

In step 510, a request (e.g., request 202) to perform an atomic write operation for a set of data is received. In some embodiments, the request is received from an application (e.g., application 122A) that has been assigned an address range of the storage units (e.g., storage devices 130, virtual storage units within one or more storage devices 130, or a combination thereof). As discussed above, this address range may be a logical or physical address range that is contiguous or non-contiguous; it may also be confined to a single storage unit or span multiple storage units. The address range may be accessible to the application for storing data (e.g., a logical block 310A). In one embodiment, the request may specify one or more addresses of the range where the data is to be stored.

In step 520, responsive to the request, the set of data is written across multiple storage units (e.g., storage devices 130A and 130B) including storing metadata (e.g., annotation 150) at a dedicated location within at least one of the storage unit. In some embodiments, step 520 includes storing a first instance of the metadata at a dedicated location within a first of the plurality of storage devices (e.g., an annotation 150 on storage device 130A) and storing a second instance of the metadata at a dedicated location within a second of the plurality of storage devices (e.g., a copy of the same annotation 150 on storage device 130B). In various embodiments, the metadata is usable to determine whether the writing completed successfully. The metadata may be used explicitly to determine writing success or implicitly. Explicit use of the metadata may include comparing timestamps or sequence identifiers among different instances of the metadata to ensure they are part of the same atomic write transaction. Implicit use of metadata may comprise a simple check whether the metadata for each storage unit exists. If the metadata for a particular storage unit does not exist this may provide a clear implicit indication that the atomic write transaction was unsuccessful.

In one embodiment, the dedicated location (e.g., a reserved range 316) resides outside of the address range (e.g., a range 312). In some embodiments, step 520 includes assigning sequence numbers to write operations performed to the units such that the sequence numbers are indicative of an order in which the write operations occurred. In one embodiment, the metadata specifies an address range (e.g., LBA range 422) where the set of data was written and a sequence number (e.g., sequence number 424) corresponding to the writing of the set of data. In some embodiments, step 520 includes storing a respective instance of a sequence number on each of the storage units to which the set of data is written and determining whether the writing completed successfully by verifying that the instances of the sequence number match. In some embodiments, the stored metadata includes metadata provided by an application that provided the request. In one embodiment, step 520 includes reading the metadata from each of the plurality of storage units and determining, based on reading the metadata, that the atomic write operation failed. In one embodiment, the reading and determining may be performed by the application requesting the atomic write; in another embodiment, the reading and determining may be performed by the driver, however. In some embodiments, step 520 includes indicating (e.g., via write status 204) that the writing failed to complete successfully to an application that submitted the request and receiving a request (e.g., rollback instruction 206) from the application to rollback the atomic write operation. In some embodiments, the indicating includes identifying one or more logical block addresses where the set of data was not written to successfully. In one embodiment, step 520 includes rolling back the atomic write operation including invalidating data written to the specified address range (e.g., LBA range 422).

It is noted that a similar method is also contemplated for an application that interacts with a computing system performing method 500—e.g., a computing system executing an application 122, in one embodiment.

Figure 6A:
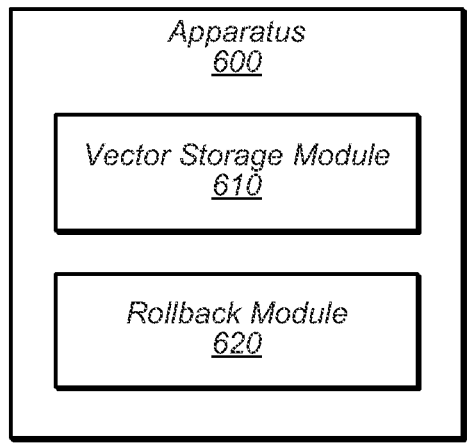
FIGS. 6A and 6B are block diagrams illustrating embodiments of apparatuses that include modules.

Turning now to FIG. 6A, a block diagram of an apparatus 600 including modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 600 may include modules to implement any of the functionality described herein. For example, in the illustrated embodiment, apparatus 600 includes a vector storage module 610 and a rollback module 620.

Vector storage module 610, in one embodiment, is configured to perform a group of storage operations for a set of data on a plurality of storage devices, including storing metadata (e.g., an annotation 150) independent of the set of data. In such an embodiment, the metadata is indicative of the group of storage operations. In some embodiments, vector storage module 610 is configured to store the metadata within a storage block (e.g., annotation packet 362) in at least one of the storage devices. The storage block may have an address (e.g., an LBA associated with a range 316) that is inaccessible to an application associated with the set of data. In one embodiment, vector storage module 610 is configured to indicate whether the group of storage operations were performed successfully (e.g., via a write status 204). In some embodiments, vector storage module 610 is configured to perform a storage operation for a portion of the set of data that includes encapsulating the portion within a packet (e.g., packet 360) having a packet header (e.g., header 410). The packet header may include one or more bits (e.g., atomic bits 414) usable to determine whether the storage operation was performed successfully. In such an embodiment, the one or more bits are distinct from the stored metadata.

Rollback module 620, in one embodiment, is configured to rollback the group of storage operations based on the stored metadata. In one embodiment, rollback module 620 is configured to perform the rollback in response to receiving a request (e.g., a rollback instruction 206). In some embodiments, the request may be a request to perform a partial rollback. In such an embodiment, rollback module 620 is configured to rollback a subset of the group of storage operations but not all of the group of storage operations in response to the request. In various embodiments, rollback module 620 is configured to rollback the group of storage operations by issuing one or more TRIM commands to the plurality of storage devices.

In some embodiments, vector storage module 610 and/or rollback module 620 are within a controller such as controller 132. In another embodiment, modules 610 and/or 620 may be located within a memory such as memory 120. In sum, the modules of apparatus 600 may be implemented in any suitable manner to perform functionality described herein. Apparatus 600 may also correspond to any suitable structure having the functionality of modules 610 and 620. In one embodiment, apparatus 600 is a computing system that includes (or is coupled to) a storage such as storage device 130. In another embodiment, apparatus 600 is a card including a controller (such as controller 132) and one or more storage elements (such as storage banks 134). In yet another embodiment, apparatus 600 is a computing system including a memory system that stores modules 610 and 620.

Figure 6B:
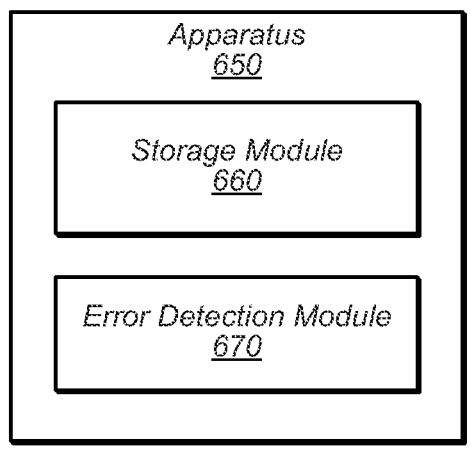

Turning now to FIG. 6B, a block diagram of an apparatus 650 including modules is depicted. Apparatus 650 may include modules to implement any of the functionality described herein and may correspond to any suitable structure such as those discussed above with respect to apparatus 600. In the illustrated embodiment, apparatus 650 includes a storage module 660 and an error detection module 670.

Storage module 660, in one embodiment, is configured to attempt an atomic write for a set of data to an address range associated with a group of storage devices. In such an embodiment, storage module 660 is further configured to store metadata (e.g., an annotation 150) in a storage block (e.g., dedicated block 314) having an address external to the address range (e.g., range 312A), the metadata being indicative of writing the set of data. In some embodiments, storage module 660 is configured to write a respective portion of the set of data to each storage device in the group of storage devices (e.g., packets 360A and 360B to storage devices 130A and 130B, respectively) along with a respective instance of a sequence number (e.g., in a payload 420 of a packet 360) indicative of an ordering in which the atomic write was attempted. In some embodiments, storage module 660 is configured to maintain a respective storage block (e.g., dedicated blocks 314A and 314B) for each of a plurality of applications (e.g., application 122A and 122B) such that each storage block includes metadata corresponding to a most recent atomic write for that application. In some embodiments, storage module 660 is configured to maintain a plurality of storage blocks for an application (e.g., multiple dedicated blocks 314A in range 316A for application 122A) such that the plurality of storage blocks includes metadata corresponding to a plurality of most-recently-performed atomic writes for the application. In one embodiment, the address range is a logical block address range (e.g., range 312A) of a sparse address space (e.g., logical address space 302). In one embodiment, the external address is a logical block address that does not abut the logical block address range.

Error detection module 670, in one embodiment, is configured to determine, based on the metadata, whether the atomic write completed successfully. In some embodiments, error detection module 670 is configured to determine whether the atomic write completed successfully by comparing the instances of the sequence number with an instance of the sequence number in the metadata (e.g., sequence number 424).

Figure 7A:
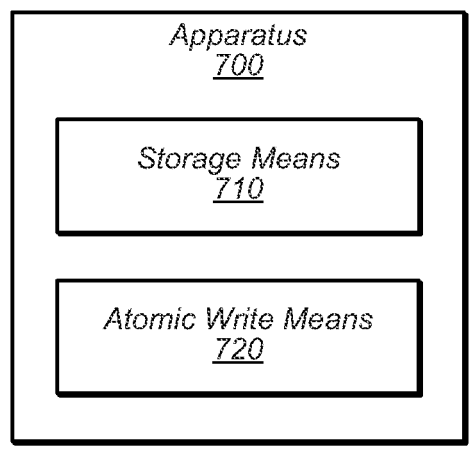
FIG. 7A is a block diagram illustrating another embodiment of an apparatus having a storage means and an atomic write means.

Turning now to FIG. 7A, a block diagram of an apparatus 700 including a storage means 710 and an atomic write means 720 is depicted. Apparatus 700 may correspond to any suitable structure having the functionality of storage means 710 and atomic write means 720. For example, apparatus 700 may be any suitable type of computing device such as a server, laptop, desktop, a mobile device, etc. In some embodiments, apparatus 700 may include multiple computing devices working together. In some embodiments, apparatus 700 is a card including a controller (such as controller 132) and one or more storage elements (such as storage banks 134).

In various embodiments, storage means 710 may implement any of the functionality described herein with respect to storage device 130. Accordingly, in one embodiment, storage means 710 is for storing data using a log-structure. Storage means 710 may correspond to any suitable structure such as those discussed above with respect to storage device 130 (e.g., one or more storage banks 134, computing system 100, storage system 200, etc.). Accordingly, the phrase "means for storing data using a log-structure" refers to any of the structures listed above as well as their corresponding equivalents.

In various embodiments, atomic write means 720 may implement any of the functionality described herein with respect to driver 126. Accordingly, in one embodiment, atomic write means 720 is for writing data atomically to a subset (e.g., range 312A) of the plurality of storage blocks and writing metadata to a storage block (e.g., dedicated block 314A) that is not within the subset. In such an embodiment, the metadata is usable to rollback the writing of the data. In some embodiments, atomic write means 720 may also implement functionality other than that described in conjunction with driver 126.

Atomic write means 720 may correspond to any suitable structure. In one embodiment, atomic write means 720 is a hardware circuit configured to perform operations (e.g., controller 132). The hardware circuit may include, for example, custom very-large-scale integration (VLSI) circuits or gate arrays, off-the-shelf semiconductors such as logic chips, transistors, or other discrete components. Means 720 may also be implemented in programmable hardware devices such as field programmable gate arrays, programmable array logic, programmable logic devices, or the like. In another embodiment, means 720 includes a memory having program instructions stored therein (e.g., RAM 120) that are executable by one or more processors (e.g., processor unit 110) to implement an algorithm. In one embodiment, means 720 implements the algorithm discussed with respect to FIG. 7B. In some embodiments, means 720 corresponds to modules 610, 620, 660, and/or 670. Accordingly, the phrase "means for writing data atomically to a subset of the plurality of storage blocks and writing metadata to a storage block that is not within the subset" refers to any of the structures listed above as well as their corresponding equivalents.

Figure 7B:
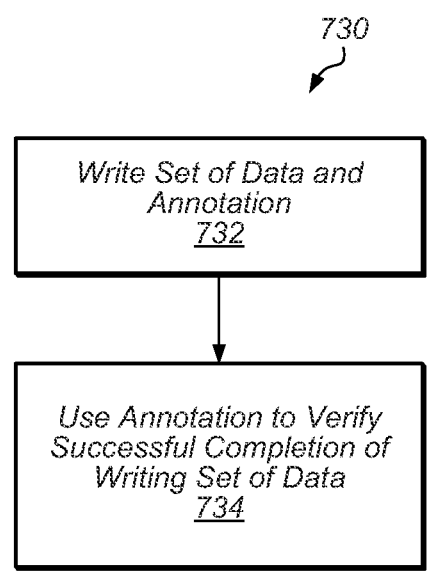
FIG. 7B is a flow diagram illustrating one embodiment of an algorithm implemented by an atomic write means.

Turning now to FIG. 7B, a flow diagram illustrating an algorithm 730 is depicted. Algorithm 730 is one embodiment of an algorithm implemented by atomic write means 720. In the illustrated embodiment, algorithm 730 includes, at step 732, writing a set of data across multiple storage devices and an annotation to at least one of the storage devices, such as discussed above. Algorithm 730 further includes, at step 734, using the annotation to verify successful completion of writing the set of data. As discussed above, in some embodiments, step 734 may include comparing sequence numbers, logical addresses, atomic bits at locations identified by the annotation, etc.

Figure 8:
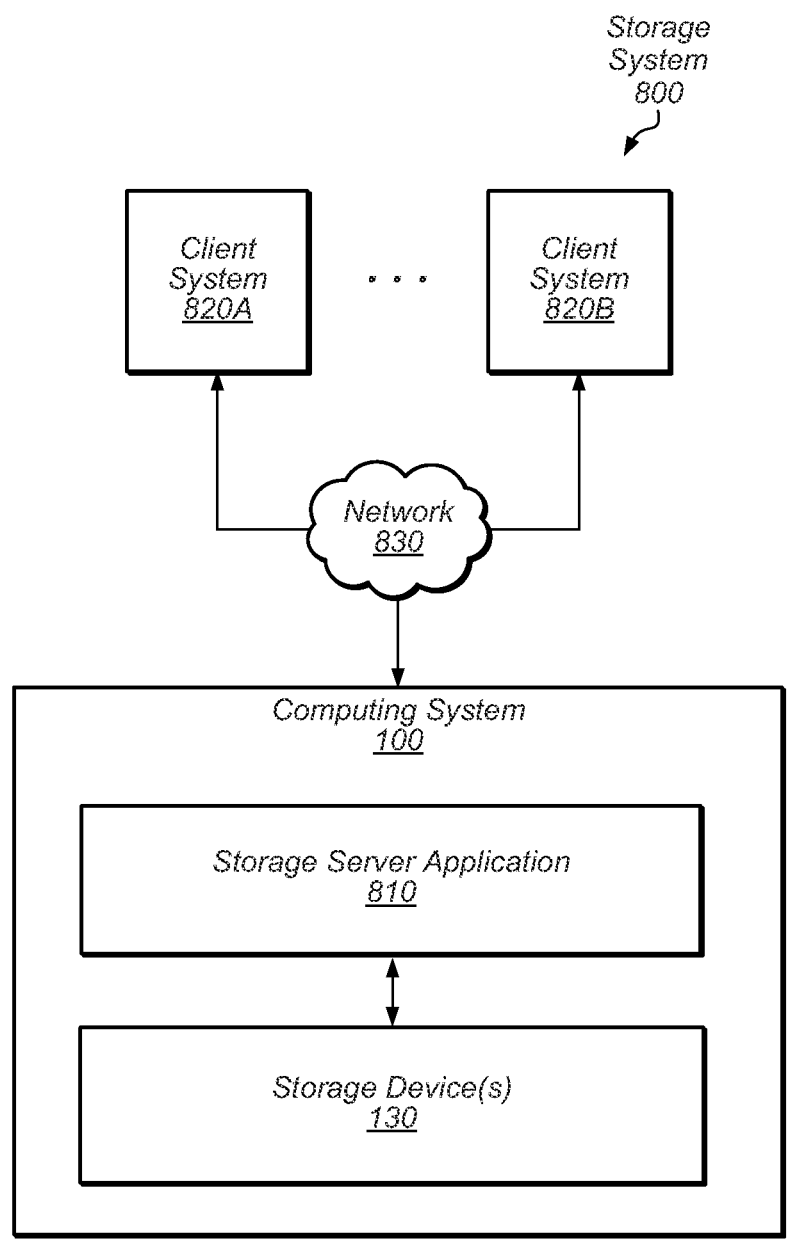
FIG. 8 is a block diagram illustrating one embodiment of a storage system including the computing system.

Turning now to FIG. 8, a block diagram of a storage system 800 including computing system 100 is depicted. As discussed above, computing system 100 may include one or more applications that operate on data stored in storage device 130. In the illustrated embodiment, computing system 100 executes a storage server application 810 to enable client systems 820A and 820B to access and store data in one or more storage devices 130 via network 830. For example, in one embodiment, storage system 800 may be associated within an enterprise environment in which server application 810 distributes enterprise data from storage device 130 to clients 820. In some embodiments, clients 820 may execute other server applications such as web servers, mail servers, virtual private network (VPN) servers, etc. to further distribute data to other computing systems. Accordingly, in some embodiments, storage server application 810 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. A method to improve recovery of a system crash using metadata the method comprising:
  receiving, from an application, a request to perform an atomic write operation for a set of data;
  responsive to the request, writing the set of data across a plurality of storage units including storing metadata at a dynamic location within at least one of the plurality of storage units; and
  deny the application access to the dynamic location at which the metadata is written,
  wherein:
    the metadata is usable to determine whether the writing completed;
    the metadata comprises multiple bits that identify the set of data of the atomic write operation; and
    the application has been assigned an accessible address range of the plurality of storage units.

2. The method of claim 1, further comprising:
  assigning at least one sequence number to atomic write operations performed to the plurality of storage units,
  wherein:
    the sequence numbers are indicative of an order in which the atomic write operations occurred; and
    the metadata specifies an address range where the set of data is written and a sequence number corresponding to the writing of the set of data.

3. The method of claim 2, further comprising:
  rolling back the atomic write operation, wherein the rolling back includes invalidating data written to the specified address range.

4. The method of claim 1, wherein:
  the writing includes storing a respective instance of a sequence number on each of the plurality of storage units to which the set of data is written;
  the metadata includes another instance of the sequence number; and
  the method further comprises determining whether the writing completed by verifying that the instances of the sequence number match.

5. The method of claim 1, further comprising:
  reading the metadata from each of the plurality of storage units; and
  determining, based on reading the metadata, that the atomic write operation failed.

6. The method of claim 1, further comprising:
  indicating, to the application, that the writing failed to complete successfully, wherein the indicating includes identifying one or more logical block addresses for which the set of data was not written successfully; and
  receiving, from the application, a request to rollback the atomic write operation.

7. The method of claim 1, wherein the stored metadata includes metadata provided by the application.

8. The method of claim 1, wherein storing the metadata includes:

storing a first instance of the metadata at a dedicated location within a first of the plurality of storage devices; and
storing a second instance of the metadata at a dedicated location within a second of the plurality of storage devices, wherein the first and second instances are redundant.

9. An apparatus to improve recovery of a system crash using metadata, the apparatus comprising:
a vector storage module configured to perform a group of storage operations for a set of data on a plurality of storage devices, including storing the metadata independent of the set of data, wherein:
the metadata indicates whether the group of storage operations was performed successfully;
the metadata comprises multiple bits that identify the set of data;
the vector storage module is configured to store the metadata within a dynamic storage block in at least one of the plurality of storage devices; and
the vector storage module is configured to deny an application associated with the set of data access to the dynamic storage block; and
a rollback module configured to rollback, in response to receiving a request, the group of storage operations based on the stored metadata;
wherein the vector storage module and the rollback module comprise one or more of circuitry and instructions stored on a non-transitory computer readable medium, and the instructions stored on the non-transitory computer readable medium are executable by one or more processors.

10. The apparatus of claim 9, wherein:
the request is a request to perform a partial rollback; and
the rollback module is configured to rollback a subset of the group of storage operations but not all of the group of storage operations in response to the request.

11. The apparatus of claim 9, wherein the rollback module is configured to rollback the group of storage operations by issuing one or more TRIM commands to the plurality of storage devices.

12. The apparatus of claim 9, wherein:
the vector storage module is configured to perform a storage operation for a portion of the set of data that includes encapsulating the portion within a packet having a packet header;
the packet header includes one or more bits usable to determine whether the storage operation was performed successfully; and
the one or more bits are distinct from the stored metadata.

13. An apparatus to improve recovery of a system crash using metadata, the apparatus comprising:
a controller configured to:
attempt an atomic write for a set of data to an address range associated with a group of storage devices;
store metadata in a storage block having a dynamic address external to the address range, wherein:
the address range is accessible to an application associated with the data;
the metadata is indicative of writing the set of data; and
the metadata comprises multiple bits that identify the set of data of the atomic write;
deny the application access to the dynamic address external to the address range;
write a respective portion of the set of data to each storage device in the group of storage devices along with a respective instance of a sequence number indicative of an ordering in which the atomic write was attempted; and
determine whether the atomic write completed successfully by comparing the instances of the sequence number with an instance of the sequence number in the metadata;
wherein the controller comprises one or more of circuitry and instructions stored on a non-transitory computer readable medium, and the instructions stored on the non-transitory computer readable medium are executable by one or more processors.

14. The apparatus of claim 13, wherein:
the controller is configured to maintain a respective storage block for each of a plurality of applications; and
each storage block includes metadata corresponding to a most recent atomic write for that application.

15. The apparatus of claim 13, wherein:
the controller is configured to maintain a plurality of storage blocks for an application; and
the plurality of storage blocks includes metadata corresponding to a plurality of most recent atomic writes for the application.

16. The apparatus of claim 13, wherein:
the address range is a logical block address range of a sparse address space; and
the external address is a logical block address that does not abut the logical block address range.

17. An apparatus to improve recovery of a system crash using metadata, the apparatus comprising:
a first means for storing data using a log-structure, wherein the first means includes a plurality of storage blocks;
a second means for writing data atomically to a subset of the plurality of storage blocks and writing the metadata to a dynamic storage block that is not within the subset, wherein:
the metadata is usable to determine whether the atomical writing of the data completed;
the metadata is usable to rollback the atomical writing of the data; and
the metadata comprises multiple bits that identify that data atomically written; and
a third means for denying a application that requests data to be written atomically access to an address of the dynamic storage block.

18. A method to improve recovery of a system crash using metadata, the method comprising:
an application issuing a request for an atomic write operation, wherein:
the atomic write operation includes writing a set of data across a plurality of storage units and writing he metadata at a dynamic location within at least one of the plurality of storage units;
the metadata is usable to determine whether the writing of the data completed; and
the metadata comprises multiple bits that identify the set of data of the atomic write operation;
the application determining, based on an attempt to read the metadata, whether the atomic write operation completed; and
denying the application access to the dynamic location.

* * * * *